Oct. 22, 1968 R. C. MINNICK 3,407,307
MAGNETIC PARITY FUNCTION GENERATOR
Filed Sept. 18, 1964
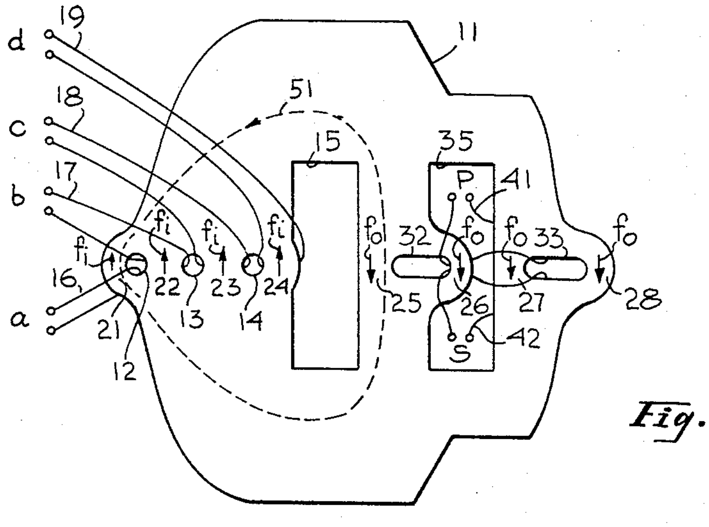
Fig. 1
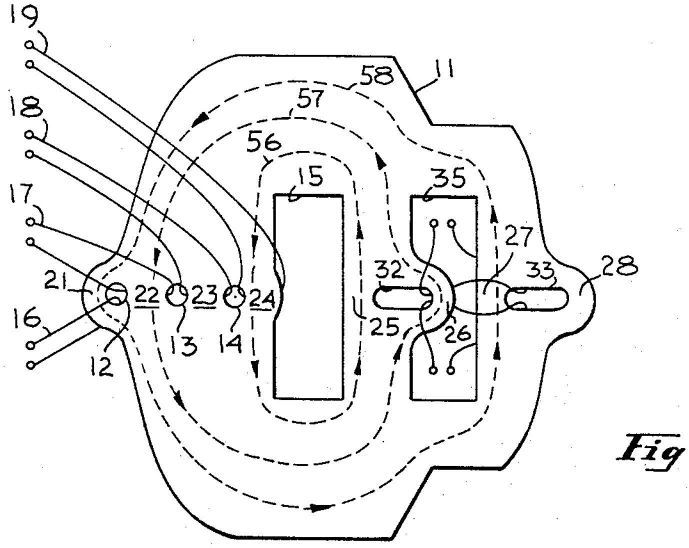
Fig. 2
| NUMBER OF TRUE INPUTS | 21 | 22 | 23 | 24 | 25 | 26 | 27 | 28 |
|---|---|---|---|---|---|---|---|---|
| 0 | ↑ | ↑ | ↑ | ↑ | ↓ | ↓ | ↓ | ↓ |
| 1 | ↓ | ↑ | ↑ | ↑ | ↑ | ↓ | ↓ | ↓ |
| 2 | ↓ | ↓ | ↑ | ↑ | ↑ | ↑ | ↓ | ↓ |
| 3 | ↓ | ↓ | ↓ | ↑ | ↑ | ↑ | ↑ | ↓ |
| 4 | ↓ | ↓ | ↓ | ↓ | ↑ | ↑ | ↑ | ↑ |
Fig. 3
INVENTOR
ROBERT C. MINNICK
BY Samuel Lindenberg
Abraham Wasserman
ATTORNEYS 3,407,307
Patented Oct. 22, 1968

3,407,307

MAGNETIC PARITY FUNCTION GENERATOR

Robert C. Minnick, Redwood City, Calif., assignor to Stanford Research Institute, Menlo Park, Calif., a corporation of California Filed Sept. 18, 1964, Ser. No. 397,422
11 Claims. (Cl. 307—88)

This invention relates to magnetic logic circuit and, more particularly, to an improved magnetic multiapertured logic circuit.

In electronic computers and other data processing systems, components and circuits have been developed to perform information storage and logic operations. The use of magnetic structures for performing these functions is quite widespread.

One logic operation is that of checking parity. An odd-parity function checker or generator is one which is used to indicate that an odd number of input signals of a given polarity are simultaneously applied to a set of input terminals. In the computer art, an odd-parity function checker is often used to produce a complementing or add bit which is a binary "1," whenever an odd number of other bits in a computer word store a binary "1," and is a binary "0" otherwise. Thus, when all the bits, including the added bit, are considered, there always is an even number of binary "1."

In prior art circuits, operating as an odd-parity function generator, a substantial number of interconnected logic circuits such as "or," and "and," and "inhibit" circuits are generally incorporated to perform the necessary logic operation, thus resulting in a complex generator made up of a great number of components. Some generators have been designed in which multiaperture magnetic ferrite cores are used. However, in such cases, the structure of the ferrite cores is quite complicated due to the great number of apertures necesesary for satisfactory performance of the cores. In other cases where the number of necessary apertures in a ferrite cores is not impractical, the overall performance of the generator has been found to be limited in its capacity to perform the logic operation on more than four input signals. Also, even when operating on only four input signals, the output signal of such a generator has bipolar characteristics thus further complicating the circuitry which need be associated with it.

Accordingly, it is an object of the present invention to provide an improved parity function generator having a magnetic structure.

Another object of the invention is the provision of an improved parity function generator utilizing a multiapertured magnetic structure.

Yet another object of the invention is to provide a parity function generator having a simplified magnetic structure.

Still another object of the invention is the provision of an improved parity function generator having an improved multiapertured magnetic structure.

These and other objects of the invention may be achieved by providing a system in which a multiapertured magnetic ferrite core having a plurality of input and output apertures is used. A plurality of input windings are wound through the input apertures each winding being wound about a single magnetic flux control leg between adjacent input apertures. In addition, primary and secondary output windings are wound about one or more of the output apertures.

In operation, the saturated magnetic flux in each of the input control legs is set to be in the same state of magnetic remanence. Similarly, the saturated magnetic flux in each of the control legs between adjacent output apertures is set to be in a second state of magnetic remanence, opposite to that of the input control legs. The signals supplied to the input windings are controlled so that the resultant magnetomotive force produced by one or more of the input windings reverses the magnetic flux tsate in one or more of the output control legs between the output apertures. The geometric relationship between the input and output apertures is such that a closed flux loop or path around only one of the output apertures is produced thereby unblocking the aperture only when an odd number of input signals are supplied to the input windings. Thus, and odd number of input signals results in one of the output apertures becoming magnetically unblocked, thereby enabling a signal on the primary output windings to be transferred to the secondary output windings and thereby indicate that an odd number of input signals are present.

The novel features that are considered characteristic of this invention are set forth with particularly in the appended claims. The invention itself both as to its organization and method of operation, as well as additional objects and advantages thereof, will be best be understood from the following description when read in connection with the accompanying drawings, in which:

FIGURE 1 is a front elevational view of a multiapertured magnetic structure used in the present invention;

FIGURE 2 is a front elevational view of a multiapertured magnetic structure similar to FIGURE 1 used to show flux disposition in response to an odd number of input signals; and FIGURE 3 is a flux vector table useful in explaining the operation of the present invention.

Reference is now made to FIGURE 1 which is a front elevational view of a multiapertured magnetic structure in accordance with the present invention. As seen therein, a magnetic structure 11 comprises input apertures 12, 13, and 14 and an auxiliary input aperture 15, such an arrangement being adequate to accommodate as many as four input signals. The number of input apertures shown has been chosen for explanatory purposes only. More than three may be employed to accommodate more than four input signals. An input winding 16 is shown wound through the input aperture 12 about a flux control leg 21 which is disposed between the aperture 12 and the outer surface of the core 11. Input windings 17, 18, and 19 are shown wound about flux control legs 22, 23, and 24 respectively, the flux control leg 22 being disposed between the apertures 12 and 13, the control leg 23 being disposed between the apertures 13 and 14, and the control leg 24 being disposed between the aperture 14 and the auxiliary input aperture 15. Input apertures 12, 13, and 14 are substantially arcular and of smaller cross-sectional area than the auxiliary input aperture 15 which has an approximately rectangular shape. The apertures 12, 13, and 14 are disposed equidistantly between one longitudinal side of the rectangularly shaped aperture 15 and the outer surface of the magnetic structure 11. Thus, the input control legs 21 through 24 are of equal width.

The multiapertured core of the present invention also comprises output apertures 32 and 33 and an auxiliary output aperture 35. The aperture 32 forms output flux control legs 25 and 26, which are disposed between the aperture 32, the auxiliary input aperture 15, and the auxiliary output aperture 35 respectively. Similarly, the output aperture 33 forms output flux control legs 27 and 28 which are disposed between the aperture 33, the auxiliary output aperture 35 and the outer surface of the structure 11 respectively. As seen from FIGURE 1, the apertures 32 and 33 have a substantially rectangular appearance with rounded opposite short sides. These apertures are disposed between the outer surface of the structure 11 and the other longitudinal side of the auxiliary input aperture 15 which is substantially greater than the apertures 32 and 33. The auxiliary output aperture 35 has approximately a rectangular shape and is about of the same size as the auxiliary input aperture 15. The aperture 35 is disposed between the output apertures 32 and 33 so that the output control legs 25 through 28 are substantially of equal width, similar to the width of the input control legs 21 through 24. The centers of all the apertures as well as the long axes of the apertures 32 and 33 and the short axes of the apertures 15 and 35, are aligned with a straight line (not shown). As a consequence, the lines of magnetic flux through any one of the control legs disposed between adjacent apertures are substantially perpendicular to the straight line. Primary output windings 41 and secondary output windings 42 are shown wound about the output control legs 26 and 27. Hereinafter, the term "flux control leg" will be interchangeably used with the term "flux path."

In operation, the structure 11 is first reset so that saturated magnetic flux in each of the control legs 21 through 24 is in the same state as indicated by the upward arrows $f_1$ which represent a first state of magnetic remanence. Similarly, the saturated magnetic flux in each of the output control legs 25 through 28 is in the same state as indicated by the downward arrows $f_0$ which represent a second state of magnetic remanence. In such a second state, both output apertures 32 and 33 are deemed to be blocked since the flux around either one of the output apertures is not closed since the magnetic flux in the two output control legs adjacent to each output aperture is in the same state. With both apertures 32 and 33 being blocked, the primary output windings 41 and the secondary output windings 42 are magnetically decoupled from one another so that a pulse impressed on the primary output windings 41 is not transferred to the secondary output windings 42. Magnetic coupling between the primary output windings 41 and the secondary output windings 42 exists only when either of the output apertures 32 and 33 is magnetically unblocked, which occurs only when the states of magnetic flux in two control legs adjacent to either output aperture are opposite to one another, so that a closed flux path is present around such aperture.

For explanatory purposes, let us assume that an input signal indicative of a binary "1," hereinafter also referred to as a true input signal, produces a magnetomotive force (MMF) in the input winding to which it is supplied, which is sufficient to reverse the magnetic flux in the input control leg about which such a winding is wound from the first state indicated by the arrow $f_1$ to the second state. For example, a true input signal of sufficient current supplied to the winding 16, will reverse the state of magnetic flux in the input control leg 21 from that shown by the arrow $f_1$ to the second state so that the lines of magnetic flux therethrough will be directed downward. As is well known, lines of flux are closed loop lines, therefore the downwardly directed lines through the input control leg 21 must find a return path to the top of the control leg 21. Since control legs 22, 23, and 24 are magnetically saturated, the shortest closure path for such lines of flux is the output control leg 25. Thus, the downwardly directed lines of flux through the input control leg 21 reverse the direction of lines of flux through the output control leg 25 from that indicated by the downward arrow $f_0$ to an upward direction, and thereby produce a closed flux loop as indicated by a dashed circle 51 in FIGURE 1.

The reversal of the direction of flux lines through the leg 25 reverse the state of magnetic flux in it to be in the first state. However, the magnetic flux state in the adjacent control leg 26 is not affected by the input signal to the winding 16 so that it remains in the second state. As a result, the magnetic flux in the two legs 25 and 26 are in opposite states, namely, the first and second states respectively. Consequently, a closed flux loop is formed around the output aperture 32, thereby unblocking it, so that a pulse on the primary output winding 41 is transferred to the secondary output windings 42. The output signal on the secondary output windings 42 thus indicates the presence of an odd number of input signals on the four input windings 16 through 19, the odd number in the foregoing example being the single input signal to the windings 16.

The current amplitudes of the input signals supplied to the four input windings 16 through 19 are controllably limited so that when a single input signal appears on any one of the four input windings, a flux state reversal takes place only in the input control leg about which the winding is wound and as a consequence thereof, only the flux state in the output control leg 25 is reversed. It is thus seen that a single input signal on one of the four input windings causes the output aperture 32 to become unblocked and thereby enable a pulse to be transferred from the primary output windings 41 to the secondary output windings 42 which is indicative of the presence of an odd number of input signals.

Whenever input signals are supplied to any two of the four input windings 16 through 19, a reversal of the flux state in two of the four input control legs takes place. As a consequence, a reversal occurs in the flux states of the output control leg 25 as well as in the output control leg 26. The reversal of the flux states in both control legs 25 and 26 maintains the aperture 32 in a blocked state since, after such reversal, flux lines pass through both control legs 25 and 26 in the same direction, namely, upwardly, thus not providing a closed flux loop around the aperture 32.

For a more complete description of the present invention, reference is now made to FIGURE 2 which is a front elevational view of the multiapertured magnetic member of the present invention similar to FIGURE 1 in which like elements are designated by like numerals. Let us assume that input signals are supplied to the input windings 17 and 19 only. Then, from FIGURE 2, it is seen that a reversal occurs in the flux states of the input control legs 22 and 24, resulting in a downward flux direction in said legs. The downward flux direction through the legs 22 and 24 results in an upward flux direction through the output control legs 25 and 26 thus providing closed flux loops for the flux lines passing through the legs 21 and 22 as indicated by the dashed paths 56 and 57. As seen from FIGURE 2, the output aperture 32 remains unblocked despite the reversal of magnetic flux state through its adjacent output control legs 25 and 26. As seen therefrom, after the reversal of flux states, flux lines through both output control legs 25 and 26 are directed upwardly, so that a closed magnetic loop is not provided around the aperture 32. Since the two true input signals do not alter the flux conditions around the aperture 33 and similarly, do not unblock the aperture 32, it is seen that the primary output windings 41 and the secondary output windings 42 remain magnetically decoupled and therefore a pulse on the primary windings 41 will not be transferred to the secondary windings 42.

From the foregoing description, it is seen that the parity function generator of the present invention utilizing a multiapertured magnetic structure as shown in FIGURES 1 and 2 operates satisfactorily, since it does not produce an output signal whenever an even number (two) of input signals are supplied thereto. For a more complete description of the present invention, let us assume that three true input signals are supplied to windings 16, 18, and 19. Then, as seen from FIGURE 2, in addition to the reversal of the flux states in the control legs 22 and 24 hereinbefore described in conjunction with the previous example, the flux in the input control leg 21 changes states as well, so that flux lines are oriented downwardly therethrough.

In light of the foregoing description, it is seen that the reversal of the direction of flux lines through the control legs 25 and 26 to an upwardly direction will not unblock the output aperture 32. However, the reversal of the direction of flux lines through the leg 27 to an upwardly direction will unblock the output aperture 33 since the direction of flux lines in the adjacent control leg 28 remains unaltered in a downward direction. Since the flux lines in the legs 27 and 28 are now in opposite directions, a closed magnetic flux loop around the aperture 33 results, thereby magnetically unblocking it. With the aperture 33 being unblocked, magnetic coupling is again provided between the primary output windings 41 and the secondary windings 42 so that a pulse on the primary windings is transferred to the secondary windings. It is thus seen that an odd number of input signals, namely three signals, provide an output signal on the secondary output windings 42, such an output signal being expected from a parity function generator which is energized by an odd number of input signals.

Whenever the multiapertured ferrite core shown in FIGURES 1 and 2 is energized by four true input signals supplied to all four input windings 16 through 19, a reversal of the flux state ocurs in all the four output control legs 25 through 29. However, despite such reversal, the apertures 32 and 33 remain blocked since the flux lines in the two control legs adjacent to each one of the apertures are in the same direction so that neither one of the apertures is provided with a closed magnetic loop therearound. With both apertures 32 and 33 remaining in the blocked state, the primary and secondary windings are magnetically decoupled thereby preventing a pulse supplied by the primary output windings 41 from being transferred to the secondary output windings 42. As a result, the parity function generator of the present invention does not supply an output signal when energized by an even (four) number of input signals.

Reference is now made to FIGURE 3 which is a magnetic flux state table useful in further explaining the operation of the multiapertured magnetic structure of the present invention. As seen therein, the direction of the magnetic flux states in the input control legs 21 through 24 as well as the states of the magnetic flux in the output control legs 25 through 28 are shown, for input signals varying in number from zero to four. Whenever the parity function generator disclosed herein is energized by an even number of input signals, the magnetic flux in control legs adjacent each one of the output apertures 32 and 33 are in the same state, thus blocking the apertures by not providing a closed magnetic loop therearound. Whenever both output apertures are blocked, a signal is prevented from being transferred from the primary output windings to the secondary output windings, the absence of an output signal on the secondary output winding indicating that an even number of true input signals are supplied to the parity function generator.

On the other hand, whenever an odd number of true input signals are supplied to the parity function generator, a reversal in the magnetic flux states in an odd number of output control legs occurs which, as a consequence, results in one or the other of the output apertures 32 and 33 being unblocked. As a result, a pulse from the primary output windings is magnetically transferred to the secondary output windings, thereby producing an output signal which indicates that an odd number of input signals are present.

From the foregoing description, it is seen that the parity function generator utilizing the multiapertured magnetic structure described hereinbefore, satisfactorily performs the logic operation of a parity function generator. The invention has been described in connection with a generator of four input signals. Such description has been presented for explanatory purposes only, it being understood that the invention is not limited thereto. Rather, the structure of the multiapertured magnetic structure of FIGURES 1 and 2 can be adapted to accommodate any number of $n$ input signals. To accommodate $n$ input signals, where $n$ is an even number, a multiapertured magnetic structure is provided with $n-1$ input apertures and a single auxiliary input aperture similar to the aperture 15 shown in FIGURES 1 and 2. In addition, the structure is provided with $n/2$ output apertures as well as an auxiliary output aperture similar to the aperture 35 between every two of the $n/2$ output apertures. Whenever a parity function generator of an odd number of inputs or variables is desired, one input may be left unused in a structure for the next higher even number of inputs or variables.

Summarizing briefly, the multiapertured magnetic structure hereinbefore described is provided with a plurality of apertures about which inputs and output windings are wound. The apertures are so arranged that only an odd number of input signals produce magnetic flux state reversals in an odd number of output control legs or flux paths, so that a single one of a plurality of output apertures is unblocked by being provided with a closed magnetic loop therearound. The unblocking of one of the output apertures enables a signal to be transferred from primary output windings to secondary output windings, the signal on the secondary output windings indicating that an odd number of input signals are present.

There has been described and shown herein a novel multiapertured magnetic structure useful as a parity function generator. It is understood that modifications may be made by one familiar in the art in the specific arrangements as shown without departing from the spirit of the invention. Accordingly, all such modifications and equivalents are intended to fall within the scope of the invention as claimed.

What is claimed is:

1. In a parity function generator for producing an output signal in response to an odd number of not more than $n$ input signals supplied thereto, the improvement comprising:

a multiapertured magnetic member having a plurality of input and output apertures providing $n$ input and output paths of magnetic flux, said magnetic flux being reversible between opposite first and second states;

input means for establishing in response to $m$ input signals the magnetic flux to be in said second state in $m$ of said $n$ input paths, $m$ being an integer not greater than $n$, the magnetic flux in said second state in said $n$ input paths reversing the state of magnetic flux in $m$ output paths to be in said first direction so as to form a closed magnetic path around a single one of said output apertures only when the integer $m$ is an odd number; and output means for providing an output signal only when a closed magnetic path around said single one of said output apertures is formed.

2. In a parity function generator as recited in claim 1 wherein said input means comprise $n$ input windings, each being wound about another one of said input flux paths so as to establish the magnetic flux therein to be in said second state whenever an input signal is supplied to said winding.

3. In a parity function generator as recited in claim 2 wherein said output means comprise primary and second windings wound through at least said output apertures to provide an output signal on said secondary windings whenever a closed magnetic path is formed about a single one of said output apertures.

4. A parity function generator operable on not more than $n$ input signals to provide an output signal in response to an odd number of said input signals supplied thereto comprising:

a multiapertured magnetic member having therein at least $n-1$ input apertures forming therebetween $n$ input paths of magnetic flux and $n/2$ output apertures, two output paths of magnetic flux being formed adjacent each one of said $n/2$ output apertures, the state of the magnetic flux in each of said input and output paths being in either a first or second opposite state;

$n$ input windings, each wound about another of said $n$ input paths of magnetic flux for establishing as a function of an input signal the magnetic flux in the respective input path to be in said first state; and output means for providing an output signal only when the magnetic flux in two output paths adjacent one of said $n/2$ output apertures is in opposite states as a function of the magnetic flux being in said first state in an odd number of said $n$ input flux paths.

5. In a parity function generator as recited in claim 4 wherein:

said output means comprise primary and secondary windings wound through at least said $n/2$ output apertures to produce an output signal on said secondary windings when the magnetic flux in two output paths adjacent one of said $n/2$ output apertures is in opposite states.

6. In an apparatus wherein an output signal is provided as an odd-parity function of not more than $n$ input signals supplied to any combination of $n$ input windings, the improvement comprising:

a multiaperture core having therein at least $n-1$ input apertures forming therebetween $n$ input paths of magnetic flux and at least $n/2$ output apertures, two output paths of magnetic flux being formed adjacent each of said $n/2$ output apertures, the direction of the magnetic flux in each of said input and output paths being reversible between first and second opposite states;

$n$ input windings each wound about another of said $n$ input paths of magnetic flux to control the direction of magnetic flux therein to be in said first state as a function of an input signal supplied thereto, the direction of magnetic flux reversed to said second state in a number of said output paths, equal to the number of input paths in which direction of the magnetic flux is controlled to be in said first state, the directions of magnetic flux in two output paths adjacent a single output aperture of said $n/2$ output apertures being in opposite states thereby providing a closed magnetic path about said single output aperture whenever the direction of magnetic flux in an odd number of said n input paths is installed to be in said first state by an odd number of input signals; and output means for producing an output signal whenever said single output aperture has a closed magnetic path thereabout.

7. In an apparatus as recited in claim 6 wherein:

said output means comprise primary and secondary windings wound through at least said $n/2$ output apertures for magnetically transferring a signal from said primary windings to said secondary windings only when said single output aperture has a closed magnetic path thereabout.

8. An apparatus for producing an output signal as an odd-parity function of not more than $n$ input signals comprising:

a magnetic member having a plurality of input and output apertures thereby forming input and output paths of magnetic flux therebetween;

input means for controlling as a function of said input signals supplied thereto the directions of magnetic flux in said plurality of input and output paths of magnetic flux, a closed magnetic flux path being formed around a single one of said output apertures whenever an odd number of input signals are supplied to said input means; and output means wound through at least said output apertures for producing an output signal whenever a closed magnetic flux path is formed around said single one of said output apertures.

9. An apparatus as recited in claim 8 wherein said output means comprises:

primary and secondary windings for producing an output signal on said secondary winding magnetically transferred thereto from said primary winding only when a magnetic closed flux path is formed around said single one of said output apertures.

10. An apparatus as recited in claim 8 wherein said input means comprises:

not more than $n$ input windings each wound about another of said input paths of magnetic flux,. each input signal being supplied to another one of said not more than $n$ input windings.

11. An apparatus as recited in claim 10 wherein said output means comprises:

primary and secondary windings for producing an output signal on said secondary winding magnetically transferred thereto from said primary winding only when a magnetic closed flux path is formed around said single one of said output apertures.

No references cited.

BERNARD KONICK, *Primary Examiner.*

P. S. BERBER, *Assistant Examiner.*